United States Patent [19]

Prochazka

[11] Patent Number: 5,599,624
[45] Date of Patent: Feb. 4, 1997

[54] AMORPHOUS SILICON OXYCARBIDE COATED SILICON CARBIDE OR CARBON FIBERS

[75] Inventor: Svante Prochazka, Ballston Lake, N.Y.

[73] Assignee: General Electric Company, Schenectady, N.Y.

[21] Appl. No.: 498,272

[22] Filed: Jul. 3, 1995

[51] Int. Cl.⁶ .................................................. D02G 3/00
[52] U.S. Cl. .................. 428/375; 428/378; 428/387; 428/379; 428/384; 428/388; 501/39; 423/447.1
[58] Field of Search ..................... 428/387, 378, 428/375, 367, 379, 408, 384, 388, 391; 501/35, 39, 53; 423/447.1

[56] References Cited

U.S. PATENT DOCUMENTS

| | | | |
|---|---|---|---|
| 4,981,820 | 1/1991 | Renlund et al. | 501/39 |
| 5,039,635 | 8/1991 | Stempin et al. | 428/408 |
| 5,279,780 | 1/1994 | Lipowitz et al. | 264/82 |
| 5,366,943 | 11/1994 | Lipowitz et al. | 501/95 |
| 5,418,194 | 5/1995 | Dawes et al. | 501/52 |

OTHER PUBLICATIONS

"Gas Phase Reactions, Fibers and Whisker, Joining" by Shigeyuki Somiya and Yoshizo Inomata, Silicon Carbide Ceramics–2–1988–pp. 81–98.
"Silicon Oxycarbide Glasses:Part I. Preparation and Chemistry", G M Renlund, S. Prochazka, R H Doremus, J. Mat. Res., vol. 6, No. 12, Dec. 1991, pp. 2716–2722.
"Silicon Oxycarbide Glasses: Part II. Structure and Properties", G M Renlund, S. Prochazka, R H Doremus, J. Mat. Res., vol. 6, No. 12, Dec. 1991, pp. 2723–2733.

*Primary Examiner*—Newton Edwards
*Attorney, Agent, or Firm*—Noreen C. Johnson; William H. Pittman

[57] ABSTRACT

Fibers having reduced surface roughness have a continuous coating of a silicone resin that undergoes pyrolysis in hydrogen or helium to form a hard, amorphous solid coat containing silicon, oxygen, and carbon. This silicon oxycarbide glass coating has exceptional high temperature strength and chemical stability compared to even vitreous silica. The coating is resistant to crystallization and oxidation at temperatures above 1000° C.

5 Claims, No Drawings

AMORPHOUS SILICON OXYCARBIDE COATED SILICON CARBIDE OR CARBON FIBERS

FIELD OF THE INVENTION

This invention relates to a coated fiber and method of forming the coated fiber. In particular, the invention relates to coatings on silicon carbide fibers to reduce pits and asperities on the fiber surface.

BACKGROUND OF THE INVENTION

Fiber reinforced composites have great potential for use in aircraft and gas turbines. This is due to the high strength to weight ratio of such materials because fibers, such as silicon carbide fibers, provide toughness. The strength, toughness, and other properties of silicon carbide fibers are determined by their microstructure which is controlled by the manner in which they are made.

Polycrystalline fibers can be prepared by extrusion and spinning of plasticised mixtures of powder with subsequent sintering. The spinning step, which extrudes the fibers, causes the fibers to exhibit a rough surface. During the deformation, particles in the fiber are displaced, causing the formation of pits and asperities. The particles often have an appreciable aspect ratio which due to rotation results in the formation of pits. Also, the elongated particles tend to orient themselves by shear forces with their long axis at a small angle to the axis of the fiber which leads to the formation of bumps.

The surface roughness generated during the spinning operation is essentially preserved in sintering because of the short firing cycle applied to the fiber. There is little or no smoothing of the fiber surface by mass transport. Consequently, the surface pits are sharp edged to their root. This makes the surface pits on the fibers undesirable stress risers which limit tensile strength.

Surface roughness degrades fiber properties in at least two ways. Pits and uneven surfaces limit the silicon carbide fiber strength. The surface defects also inhibit the sliding of fiber surfaces pass each other which is required in the manipulation of fiber strands. Asperities bring about high friction and the fiber breaks.

There is a need to provide a silicon carbide fiber having a surface with reduced pits and asperities and improved strength.

SUMMARY OF THE INVENTION

Fibers having reduced surface roughness are comprised of fibers having a continuous coating formed by pyrolysis of a silicon based resin yielding an amorphous solid coat containing silicon, oxygen, and carbon, having glass-like properties. This silicon oxycarbide glass coating has exceptional high temperature strength and chemical stability compared to even vitreous silica. The coating is resistant to crystallization and oxidation at temperatures above 1000° C. Further, the coating on the fiber is not just a mixture of silica, and silicon carbide or carbon, but rather is one of a series of homogeneous, probably metastable, amorphous solids in the silicon-oxygen-carbon system.

The fibers are from the group consisting of elemental carbon, silicon carbide, and mixtures thereof. The silicon oxycarbide glass coating protects the fiber so that the fiber has a desirable surface smoothness with reduced pits and asperities. As a result, the coating reduces friction between fibers bundled in strands and decreases stress risers from pits on the fiber surface. The term asperities means bumps or hills and valleys on a fiber leading to a rough, uneven surface.

A process for producing a tough coated fiber where the fiber is selected from the group consisting of elemental carbon, silicon carbide, and mixtures thereof, comprises depositing a continuous coating on the fiber wherein the coating is a silicon based resin, and pyrolyzing the coating on the fiber to form a dense, hard adherent amorphous coating containing silicon, carbon, and oxygen. The coated fibers can be further admixed with other matter, such as carbonaceous material, and processed to form fiber reinforcing high strength composites.

DESCRIPTION OF THE INVENTION

The coatings of this invention are beneficial for strengthening the fiber, smoothing the fiber surface, and eliminating friction between fibers. Such coatings are stable under certain process conditions for fiber reinforced composite fabrication and at high temperatures above 1000° C. The coatings have a high elastic modulus, and a thermal expansion generally less than silicon carbide which puts the fiber surface in compression at low temperature thus enhancing strength. They are chemically compatible with silicon carbide, and can be applied to the fiber in a practical and inexpensive manner.

The fiber coating should have idealy properties similar to silicon carbide. Certain silicon based resins, such as polysilanes, polycarbosilanes, polysilazenes, and polysiloxanes, which yield high glassy amorphous residues on pyrolysis, composed of carbon, silicon, and oxygen, are contemplated as coatings for fibers.

As used herein, the terms "fiber or fibers" include fibers, filaments, tows, cloth, and combinations thereof. The fibers to be coated with the silicone resin are selected from the group consisting of elemental carbon, silicon carbide, and combinations thereof.

Herein reference to silicon carbide fiber means a fiber made by spinning, i.e. a process similar to one used in making of synthetic fibers. A paste of silicon carbide powder dispersed in solutions of polymers is extruded hot through a nozzle, stretched to reduce thickness and heat treated such as to first remove the polymer vehicle and then sinter the fiber to a dense nonporous state. Such process is described in U.S. Pat. No. 4,9088,340, date Mar. 13, 1990.

Reference herein to fibers of carbon include amorphous, carbon fibers such as derived from the pyrolysis of rayon, polyacrylonitrile or pitch. Preferably, the carbon fibers have at room temperature, i.e. about 22° C. in air a minimum tensile strength of about 100,000 pounds per square inch (psi) and a minimum tensile modulus of about 25 million psi.

The fibers can be used as a continuous filament, or as discontinuous fibers, which frequently have an aspect ratio of at least 10, and in one embodiment it is higher than 50, and yet in another embodiment it is higher than 1000. Low aspect ratio fibers are preferred when a random mixture of the fibers is used in high strength composites. On the other hand, in an ordered array of fibers, high aspect ratio fibers are preferred since they produce composites with the highest density of reinforcement and the best mechanical properties. Generally, the fibers range from about 3 microns to about 150 microns in diameter, and from about 10 microns to about 10 centimeters in length or longer. Frequently, the fiber can be continuous and as long as desired.

Continuous fibers can be filament-wound to form a cylindrical tube, or formed into sheets by placing long lengths of fiber next to and parallel to one another. Such sheets can consist of single or multiple layers of filaments. Continuous filaments can also be woven, braided, or otherwise arrayed into desired configurations. When fibers are continuous or very long the use of the term "aspect ratio" is no longer useful.

The coating is a silicon based resin that pyrolyzes in a protective atmosphere to form generally a black, hard, amorphous solid containing oxygen, silicon, and carbon. After pyrolysis, the coating is a silicon oxycarbide glass coating. This glass coating is dense and may form at temperatures below about 900° C. and is stable to temperatures as high as 1400° C.

Different silicon based resins and reagents can be used to make the oxycarbide glass coating on the fiber. The contemplated resins are polysilanes, polycarbosilanes, polysilarenes, polysiloxanes, copolymers of these resins, and mixtures thereof. Examples of these resins include polymethylphenylpolydimethyl silane, polydimethylcarbosilane, polytrimethylmethoxysiloxane.

A starting commercial silicone resin crosslinked during processing yielded, for example, a glassy pyrolytic product composed of 47 weight percent silicon, 41% oxygen and 12% carbon. A pyrolytic product of a polypheylmethylpolydimethylsilane copolymer contained 30.6% silicon, 67.8% carbon, a 1.4% oxygen and a pyrolytic product of polydimethylcarbosilane showed 50.4% silicon, 42.6% carbon, 6.0% oxygen and 0.8% boron.

Silicone resins chosen as coatings need to be soluble in volatile solvents, such as toluene, isopropyl alcohol, ethanol, ketones, ethers, or their mixtures.

The solution of the silicon based resins is used to coat the fibers by dipping or sizing i.e. immersing the fibers into the solutions and drying. The thickness of the resulting coat is primarily controlled by viscosity, surface tension and concentration of the solution. These parameters can be adjusted, within certain limits by selecting the solvent composition. It is the purpose of mixing the solvents to optimize the properties of the solution and tabulated solvent properties in chemical handbooks offer guidance. Solutions with very low surface tension and with viscosities in the range of 100 to 200 centipoise were applicable. The thickness may vary from a fraction of a micrometer up to several micrometers, however thick coatings, more than about a micrometer may result in reduced adherence after pyrolysis and are therefore undesirable.

After the fiber is dipped into the resin-solvent admixture, the admixture coating on the fiber is allowed to dry. Drying removes the volatile solvents from the film and can take place in stagnant air or in an air current, at room temperature or at elevated temperatures. At elevated temperatures, in the range of 100° C. to 400° C. many of the resins undergo chemical reactions that result in crosslinking by which they become infusible. Until crrosslinking is completed the fibers must be isolated from each other and from all contact points to prevent attachment due to the thickness of the coating. During the crosslinking some of the resins, such as polysilanes and carbosilanes, tend to pick up substantial quantities of oxygen. If this is undesirable it can be prevented by using a protective atmosphere of argon, nitrogen or other unreactive gases. With some resins, however, the reaction with oxygen accelerates crosslinking and needs be controlled rather than prevented. The control of reaction rate then may be achieved by using an inert atmosphere with a small admixture of air or oxygen. After drying, the fiber can be stored for later processing or the coating can immediately undergo pyrolysis.

Pyrolysis has to be done at a heating regime specific for the resin and coating thickness. Generally, a dense silicon oxycarbide glass is formed from silicone resins at temperatures below about 900° C. Higher temperatures, about 1100° C., completely convert the silicone resin to silicon oxycarbide glass, with minimal weight loss at higher temperatures. Heating can go up to about 1400° C. without damaging the silicon oxycarbide glass. The heating is done in a protective atmosphere, such as hydrogen, argon, helium, and mixtures thereof. The pyrolysis time may range from seconds to hours, with the time being chosen by the thickness of the coating and the type of resin used to coat the fiber. A too rapid heating cycle during pyrolysis results in poor adhesion at the fiber surface and has to be avoided. It is manifested by separation of the coating at a fracture point which is best observed in a scanning electron microscope. Pyrolysis is carried out in a suitable furnace for the selected high temperatures, i.e. 900°–1400° C. capable of operation in a protective atmosphere. The pyrolysis may be carried out with individual fibers, fiber bundles, spooled fibers, but also after the fibers were aligned or woven into preforms.

The present invention is applicable to any silicon based resin that gives a silicon oxycarbide glass upon pyrolysis with an appreciable yield. The following detailed description of the invention referring to one type of silicon based resin is representative of the practice of the invention using other silicon based resins that after pyrolysis form an oxycarbide glass. To further demonstrate the use of a silicone based resin coating, methyl-siloxane manufactured by a hydrolysis-condensation polymerization reaction with trade name SR 350 (General Electric Silicon Products Division, Waterford, N.Y.) is discussed to exemplify the structure and properties of a suitable silicone resin as a fiber coating.

Methyl-siloxane is solid at 20° C., softens at about 30° C., and becomes fluid at 90° C. At 20° C. it is clear hard and brittle and has a density of 1.08 grams per cubic centimeter. This resin is soluble in many polar and nonpolar liquids such as toluene, xylenes, ketones, alcohols, and di-ethyl ether. Structurally it is a partially branched silicon-oxygen chain with methyl and hydroxyl substituents and terminated by methyl groups. The molecular weight is variable.

The starting reagents for making methylsiloxane resin are about 2 to 8 percent dimethyl dichlorosilane and about 92 to 98 percent methyl trichlorosilane. In a three component solvent of water, toluene, and isopropyl alcohol the chlorine atoms are stripped by hydrolysis to give an unstable mixture of di-ols, tri-ols, and hydrochloric gas, for example by the reaction:

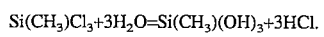

Si(CH$_3$)Cl$_3$+3H$_2$O=Si(CH$_3$)(OH)$_3$+3HCl.

These unstable silanol intermediates react by condensation of —OH groups by eliminating water to form a silicon-oxygen chain polymer with some siloxane rings.

A simple polymer segment contains one methyl and one —OH group attached to each silicon atom along the backbone chain:

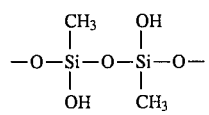

The actual polymer is more complicated, with branching and rings. The resin is not entirely stable at room temperature, and the condensation reaction continues, giving a variable ratio of —OH to —CH$_3$ substituents, usually much less than one.

Upon pyrolyzing the methyl-siloxane resin it was found that the density increases and the color changes from clear to yellow between about 200°–300° C., from yellow to brown between about 600°–750° C., and to black above about 850° C. At about 1100° C., the resin is completely converted to glass with minimal weight loss at higher temperatures.

The following examples further serve to demonstrate the invention. The examples describe individual sintered silicon carbide fibers about 35 micrometers thick coated with a silicone resin that formed the silicon oxycarbide glass.

EXAMPLE 1

A fifteen by weight percent solution of dimethyldiphenyl carbosilane copolymer was prepared in a mixture of p-xylene and methylisobutyl ketone, three to one by weight. Separate experiments established that the pure resin when heated in bulk in a hydrogen/argon mixture at a rate of about ten degrees per minute would melt at first, cross link and eventually pyrolyze leaving a foamy brown mixture. The yield of this residue at 1400° C. was seventy-three weight percent and was assayed to contain carbon (42%), silicon (45%), and oxygen (11%). Silicon carbide fibers were dipped into the resin solution and air dried. The fibers were then placed in a carbon boat and covered with a silicon carbide slab. Pyrolysis was done in a hydrogen/argon atmosphere of about 1 part hydrogen to 99 parts argon in a carbon resistor furnace at a heating rate of 4.5° C. per minute to 1400° C. at which temperature a five minute hold was imposed and the furnace shut off after that.

An inspection of the fiber surface by scanning electron microscope revealed a thin coating which was manifested by rounded off edges and was adherent to the fiber. The thickness of the coating was estimated to be a fraction of a micrometer. The coating thickness did not increase when the dipping procedure was repeated after drying.

EXAMPLE 2

The silicone resin, methyl siloxane, was dissolved in a mixture of toluene and methylisobutyl ketone in a 50/50 mixture to form a 50 by weight percent solution. The solution was more viscous than the solution in Example 1. Also, this resin crosslinks on drying so that no remelting occurs when it is reheated at the beginning of the pyrolysis. The coating procedure similar to the one in Example 1 was followed to coat the fibers and pyrolysis was carried out under the same conditions. A heavy coating, about two micrometers thick, was revealed on inspecting the coated fiber by a scanning electron microscope. The heavy coating showed a very smooth, uniform surface which covered the entire underlying fiber morphology.

It should be pointed out that the silicon oxycarbide glass coating produced from methyl siloxane has unusual stability at high temperature and desirable properties. Table 1 gives some properties of such silicon oxycarbide glass in comparison to vitreous silica.

TABLE 1

| Property | Properties of Silicon Oxycarbide Glass | | |
|---|---|---|---|
| | Silicon Oxycarbide Value | Comments | Values for vitreous silica |
| Density | 2.35 gm/cm$^3$ | | 2.20 |
| Coefficient of the thermal expansion | 3.14(10)$^{-6}$/K | Average of many samples on cooling between 1000° C. and 100° C.; hot pressed | 0.5 |
| Vickers hardness | 8.55 kg/mm$^2$ 704 Kg/mm$^2$ | 200 gm load 1000 gm load | 600 to 700 |
| Critical stress intensity factor | 1.8 MPa √m | 1000 gm load | 1 |
| Fracture strength | 153 MPa ± 20 MPa SD 385 MPa ± 227 MPa SD | 3-pt. bending of 0.74 mm diameter fibers 3-pt. bending of bars | |
| Young's elastic modulus | 97.9 GPa | | 70 |
| Index of refraction | 1.58 | At 0.5983 μm | 1.46 |
| Glass transition | 1350° K. | Viscosity of 10$^{13}$p | 1190° |
| Dielectric constant | 4.4 | 25° C., 10 to 10$^7$ Hz pyrolyzed to 1100° C. | 4 |
| Dielectric loss tangent | 0.1 | 25° C., 10 to 10$^7$ Hz pyrolyzed to 1100° C. | 10$^{-4}$ |
| Electrical conductivity | 4(10)$^{-13}$/ ohm-cm | 25° C., pyrolyzed to 1100° C. | ~10$^{-22}$ |

What is claimed:

1. A silicon carbide or carbon fiber having reduced surface roughness comprising the silicon carbide or carbon fiber having a continuous surface coating of a silicone resin on an outer surface of said fiber, where the silicone resin coated silicon carbide or carbon fiber undergoes pyrolysis in a protective atmosphere to form a hard, solid silicon oxycarbide glass coat on the outer surface of the silicon carbide or carbon fiber.

2. A silicon carbide or carbon fiber according to claim 1 where the silicone resin is polycarbosilane.

3. A fiber according to claim 1 where pyrolysis occurs at a temperature between about 900°–1400° C. and the protective atmosphere is selected from the group consisting of hydrogen, helium, argon, and mixtures thereof.

4. A silicon carbide or carbon fiber according to claim 1 where the silicon resin has a —O—Si—O— backbone that forms silicon oxycarbide glass after pyrolysis.

5. A silicon carbide or carbon fiber having a outer surface coating of an silicon oxycarbide glass.

* * * * *

UNITED STATES PATENT AND TRADEMARK OFFICE
CERTIFICATE OF CORRECTION

PATENT NO. : 5,599,624

DATED : FEBRUARY 4, 1997

INVENTOR(S) : SVANTE PROCHAZKA

It is certified that error appears in the above-identified patent and that said Letters Patent is hereby corrected as shown below:

Column 1, line 3,

-- This invention was made with government support under Contract No. NAS3-26385 awarded by the National Aeronautics and Space Administration. The government may have certain rights to the invention.--

Signed and Sealed this

Sixteenth Day of September, 1997

*Attest:*

BRUCE LEHMAN

*Attesting Officer*     *Commissioner of Patents and Trademarks*